United States Patent
Son et al.

(10) Patent No.: US 10,908,046 B2
(45) Date of Patent: Feb. 2, 2021

(54) SYSTEM AND METHOD FOR DETECTING AIR LEAK IN COMMERCIAL VEHICLE

(71) Applicants: Hyundai Motor Company, Seoul (KR); Kia Motors Corporation, Seoul (KR); SM Instruments Inc., Daejeon (KR)

(72) Inventors: TaeWon Son, Jeollabuk-do (KR); In Kwon Kim, Daejeon (KR); Kwang Hyun Lee, Daejeon (KR); Young-Key Kim, Daejeon (KR)

(73) Assignees: Hyundai Motor Company, Seoul (KR); Kia Motors Corporation, Seoul (KR); SM Instruments Co., Ltd, Daejeon (KR)

( * ) Notice: Subject to any disclaimer, the term of this patent is extended or adjusted under 35 U.S.C. 154(b) by 0 days.

(21) Appl. No.: 16/682,097

(22) Filed: Nov. 13, 2019

(65) Prior Publication Data

US 2020/0292406 A1 Sep. 17, 2020

(30) Foreign Application Priority Data

Mar. 12, 2019 (KR) .................. 10-2019-0028124

(51) Int. Cl.
*G01M 3/24* (2006.01)
*G01B 11/02* (2006.01)
(Continued)

(52) U.S. Cl.
CPC .............. *G01M 3/24* (2013.01); *G01B 17/00* (2013.01); *H04N 5/232* (2013.01); *H04N 5/265* (2013.01); *H04N 7/188* (2013.01); *G06K 7/1413* (2013.01)

(58) Field of Classification Search
CPC ......... G01M 3/24; H04N 7/188; H04N 5/265; H04N 5/232; G01B 17/00; G06K 7/1413
(Continued)

(56) References Cited

U.S. PATENT DOCUMENTS

| | | | |
|---|---|---|---|
| 2007/0076526 A1* | 4/2007 | Aikyo | G01S 15/931 367/128 |
| 2007/0136088 A1* | 6/2007 | Farrel | G06Q 30/016 73/861.18 |

(Continued)

FOREIGN PATENT DOCUMENTS

| | | |
|---|---|---|
| KR | 101213539 B1 | 12/2012 |
| KR | 101213540 B1 | 12/2012 |

(Continued)

*Primary Examiner* — Susan E. Hodges
(74) *Attorney, Agent, or Firm* — Mintz Levin Cohn Ferris Glovsky and Popeo, P.C.; Peter F. Corless

(57) ABSTRACT

A system and method for detecting an air leak in a commercial vehicle can detect an air leaked portion of the commercial vehicle using ultrasonic signals measured by a plurality of measurement sensors. The system includes a detection unit for measuring a plurality of ultrasonic signals generated in the commercial vehicle through the plurality of measurement sensors, confirming a position and size of a leak portion where air is leaked based on the plurality of ultrasonic signals to generate sensing data, and generating a photographed image by photographing the commercial vehicle, a management unit for generating a transformed image using a reference value from the sensing data, and a synthesized image by synthesizing the transformed image and the photographed image, and a display unit displaying the synthesized image.

9 Claims, 9 Drawing Sheets

(51) Int. Cl.
*H04N 5/232* (2006.01)
*H04N 5/265* (2006.01)
*H04N 7/18* (2006.01)
*G01B 17/00* (2006.01)
*G06K 7/14* (2006.01)

(58) Field of Classification Search
USPC .......................................................... 348/125
See application file for complete search history.

(56) References Cited

U.S. PATENT DOCUMENTS

2007/0238993 A1* 10/2007 Clarke .................... G01M 3/24
 600/437
2009/0013763 A1* 1/2009 Gayle .................... G01N 29/11
 73/40.5 A

FOREIGN PATENT DOCUMENTS

| KR | 101471299 B1 | 12/2014 |
| KR | 101471300 B1 | 12/2014 |

* cited by examiner

FIG. 7
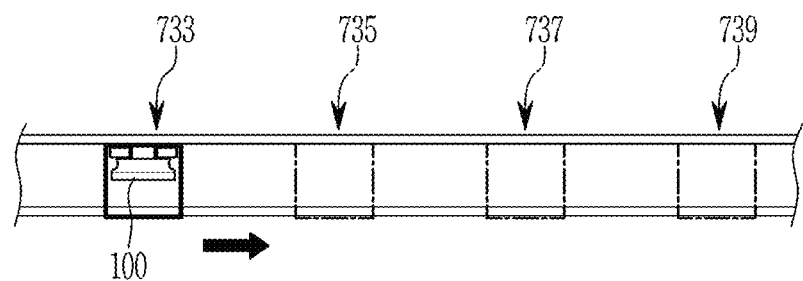
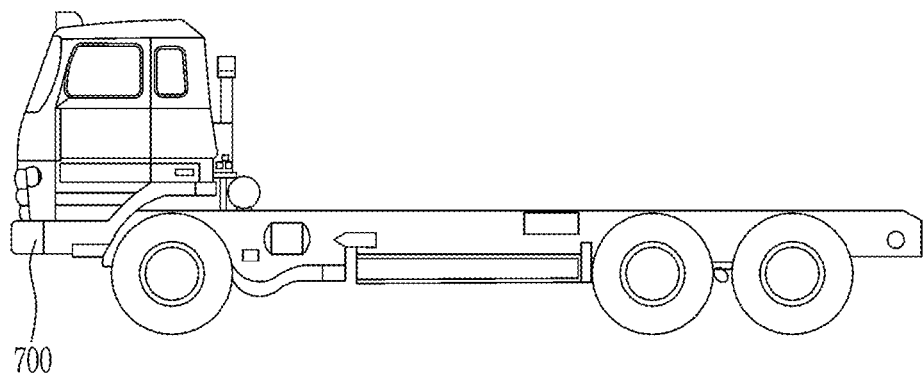

FIG. 8
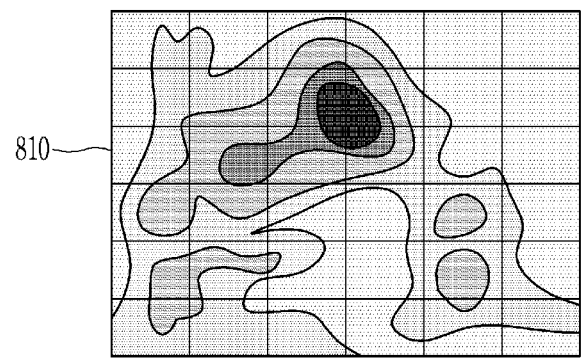
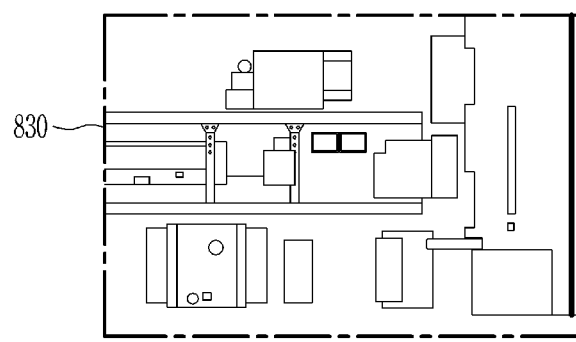
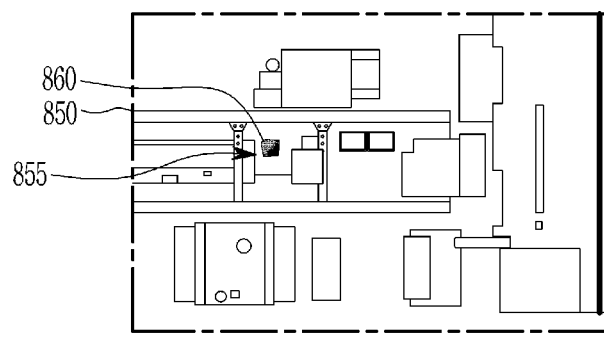

| Vehicle type : 6X4 TRT QZ | | | |
|---|---|---|---|
| Measurement position#1 | Measuring | Normal | Defective |
| Measurement position#2 | Measuring | Normal | Defective |
| Measurement position#3 | Measuring | Normal | Defective |
| Measurement position#4 | Measuring | Normal | Defective |

SYSTEM AND METHOD FOR DETECTING AIR LEAK IN COMMERCIAL VEHICLE

CROSS-REFERENCE TO RELATED APPLICATION

This application claims under 35 U.S.C. § 119(a) the benefit of Korean Patent Application No. 10-2019-0028124 filed in the Korean Intellectual Property Office on Mar. 12, 2019, the entire contents of which are incorporated herein by reference.

BACKGROUND

(a) Technical Field

The present disclosure relates to a system and method for detecting an air leak in a commercial vehicle, more particularly, to the system and method that can detect an air leaked portion of a commercial vehicle using ultrasonic signals measured by a plurality of measurement sensors.

(b) Description of the Related Art

Generally, a commercial vehicle refers to a vehicle used for commercial purposes, including trucks, buses, trailers, and the like.

In commercial vehicles, compressed air is used in pneumatic actuators such as braking devices, suspension devices, steering devices, and convenience devices for customers to ensure operational feeling and operational reliability.

That is, as a braking device, an air brake typically is used, unlike a general passenger car. Such an air brake has a strong braking force as compared with a hydraulic brake, and can generate braking force by using compressed air.

Further, suspension devices and steering devices also include air suspension. Such an air suspension utilizes the elasticity of compressed air to support the weight of a commercial vehicle, to absorb vibrations and shocks from the road surface, and to attenuate irregular vibrations transmitted from the wheels to ensure safe operation.

Further, the convenience devices include a commercial seat in which a driver sits and operates the vehicle, an air horn that vibrates a diaphragm using compressed air to inform the surroundings of danger, and an air gun that can clean the interior of the commercial vehicle through compressed air.

The pneumatic actuator is connected to an air tank of a commercial vehicle through an air connecting line and receives air stored in the air tank through an air connecting line. If air is leaked from air systems such as pneumatic actuators and air connections, there is a high probability of accidents due to defects in the braking devices, suspension devices, steering devices, etc., and the likelihood of inconvenience caused to the driver due to the failure of a convenience device.

Accordingly, in order to assure the quality and stability of the air system, a process of detecting an air leak is essential to the manufacture and operation of a commercial vehicle.

However, in the conventional case, since an operator has directly checked a leakage using a test liquid such as soapy water, inspection time and inspection cost are high, and since the inspection test is performed manually, it may be skipped or inaccurately performed.

The above information disclosed in this Background section is only for enhancement of understanding of the background of the disclosure and therefore it may contain information that does not form the prior art that is already known in this country to a person of ordinary skill in the art.

SUMMARY

The present disclosure provides a system and a method for detecting an air leak in a commercial vehicle that can detect an air leak portion of a commercial vehicle using ultrasonic signals measured by a plurality of measurement sensors.

Further, an exemplary embodiment of the present disclosure provides a system and a method for detecting an air leak in a commercial vehicle that can visualize a leak portion of the commercial vehicle.

A system for detecting an air leak in a commercial vehicle according to an exemplary embodiment of the present disclosure includes a detection unit for measuring a plurality of ultrasonic signals generated in the commercial vehicle through a plurality of measurement sensors, confirming a position and size of a leak portion where air is leaked based on the plurality of ultrasonic signals to generate sensing data, and generating a photographed image by photographing the commercial vehicle, a management unit for generating a transformed image using a reference value from the sensing data, and a synthesized image by synthesizing the transformed image and the photographed image, and a display unit displaying the synthesized image.

Further, the detection unit may include a plurality of measurement sensors for measuring a plurality of ultrasonic signals generated in the leak portion, a camera for photographing the commercial vehicle, a main board on a front surface of which the plurality of measurement sensors are arranged in a set pattern, a photographing controller connected to the camera and generating a photographed image photographed through the camera, a battery for supplying power to the plurality of measurement sensors and the camera, a measurement controller for generating the sensing data based on the ultrasonic signals collected through the plurality of measurement sensors, and a power supply controller for controlling power supply to the plurality of measurement sensors.

Further, the measurement controller may collect the plurality of ultrasonic signals from the plurality of measurement sensors, confirm a position data with respect to the leak portion based on a difference in the collected acquisition time, calculate an average value of the plurality of ultrasonic signals, and generate a size data for the leak portion based on the average value.

Further, the measurement controller may filter a noise signal included in each of the plurality of ultrasonic signals.

Further, the detection unit may include a case having a front receiving portion having a front surface opened to receive the main board and a rear receiving portion connected to the front receiving portion and receiving the photographing controller, the battery, the measurement controller, and the power controller, a front cover having a plurality of holes corresponding to the camera and the plurality of measurement sensors so that the camera and the plurality of measurement sensors are exposed to the outside, and a handle formed on both sides of the rear of the case.

Further, the management unit may generate an extracted data by extracting data in which a size data included in the sensing data is greater than or equal to the reference value, and generates a transformed image using the extracted data.

Further, the management unit may confirm the detection result based on a size data included in the sensing data and the reference value, and generate a result data including the detection result.

Further, the system for detecting an air leak in a commercial vehicle further includes a barcode scanner for recognizing the identification barcode of the commercial vehicle and generating barcode data, wherein the management unit receives barcode data from the barcode scanner, extracts vehicle identification data from the barcode data, and generates management data by matching the result data with the vehicle identification data.

Further, a method for detecting an air leak in a commercial vehicle according to another exemplary embodiment of the present disclosure includes confirming a barcode data of the commercial vehicle, measuring a plurality of ultrasonic signals generated in the commercial vehicle through a plurality of measurement sensors after photographing the commercial vehicle to generate a photographed image, generating sensing data by confirming a position and size of a leak portion where air is leaked based on the plurality of ultrasonic signals measured from the plurality of measurement sensors, generating a transformed image using a reference value from the sensing data, synthesizing the transformed image and the photographed image to generate a synthesized image, and displaying the synthesized image.

In an exemplary embodiment of the present disclosure, it is possible to detect an air leaked portion in a commercial vehicle through a plurality of measurement sensors, therefore the inspection time and the inspection cost can be saved, and the accuracy of the detection can be improved.

Further, since the leak portion of the commercial vehicle can be visualized, the operator can easily grasp the leak portion and repair it.

In addition, effects obtainable or predicted by the embodiments of the present disclosure will be directly or implicitly disclosed in the detailed description of the embodiments of the present disclosure. That is, various effects to be predicted according to the embodiment of the present disclosure will be disclosed in the detailed description to be described later.

BRIEF DESCRIPTION OF THE DRAWINGS

FIG. 7 is an exemplary view for explaining a method for detecting an air leak in a commercial vehicle according to an exemplary embodiment of the present disclosure.

FIG. 8 is an exemplary view for explaining a synthesized image of a method for detecting an air leak in a commercial vehicle according to an exemplary embodiment of the present disclosure.

FIG. 9 is an exemplary view for explaining a result data of a method for detecting an air leak in a commercial vehicle according to an exemplary embodiment of the present disclosure.

DETAILED DESCRIPTION OF THE EMBODIMENTS

Figure 1:
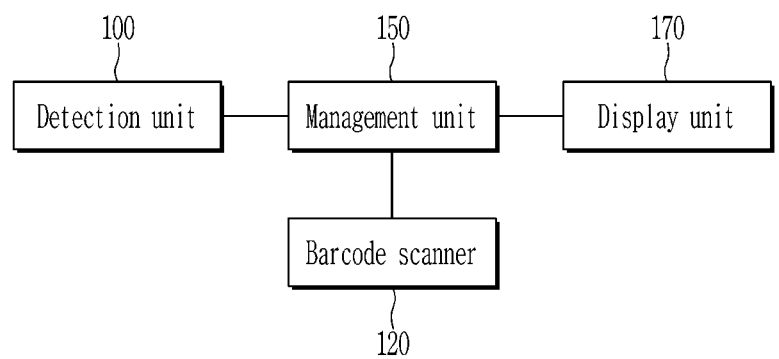
FIG. 1 is a schematic diagram showing a system for detecting an air leak in a commercial vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The operation principles of a system and a method for detecting an air leak in a commercial vehicle according an exemplary embodiment of the present disclosure will be described hereafter with reference to the accompanying drawings. However, the drawings to be described below and the following detailed description relate to one preferred exemplary embodiment of various exemplary embodiments for effectively explaining the characteristics of the present disclosure. Therefore, the present disclosure should not be construed as being limited to the drawings and the following description.

Further, in the description of the present disclosure, the detailed description of related well-known configurations and functions is not provided, when it is determined as unnecessarily making the scope of the present disclosure unclear. Further, the terminologies to be described below are ones defined in consideration of their function in the present disclosure and may be changed by the intention of a user or an operator or a custom. Therefore, their definition should be determined on the basis of the description of the present disclosure.

Further, in the following exemplary embodiments, the terminologies are appropriately changed, combined, or divided so that those skilled in the art can clearly understand them, in order to efficiently explain the main technical characteristics of the present disclosure, but the present disclosure is not limited thereto.

Hereinafter, exemplary embodiments of the present disclosure will be described in detail with reference to the accompanying drawings.

FIG. 1 is a schematic diagram showing a system for detecting an air leak in a commercial vehicle according to an exemplary embodiment of the present disclosure.

Referring to FIG. 1, a system for detecting an air leak in a commercial vehicle includes a detection unit 100, a barcode scanner 120, a management unit 150, and a display unit 170.

The detection unit 100 measures ultrasonic signals generated in the commercial vehicle. The detection unit 100 confirms a position and size of a leak portion where air is leaked based on the measured ultrasonic signals. The detection unit 100 generates sensing data including position data and size data of the leak portion. The detection unit 100 provides the generated sensing data to the management unit 150.

Further, the detection unit 100 photographs the commercial vehicle, and provides the generated photographed image to the management unit 150.

The detection unit 100 will be described in more detail with reference to FIGS. 2 to 5.

The barcode scanner 120 recognizes a barcode of the commercial vehicle. That is, the barcode scanner 120 recognizes the barcode attached on one side of the commercial vehicle to generate barcode data. Here, the barcode may be a one-dimensional barcode or a two-dimensional barcode. The two-dimensional barcode may be one of a QR (Quick Response) code, a Maxi code, a Data Matrix code, and PDF417.

The barcode scanner 120 transmits the generated barcode data to the management unit 150.

The management unit 150 is communicatively connected to the detection unit 100, the barcode scanner 120, and the display unit 170. That is, the management unit 150 can be connected to the detection unit 100, the barcode scanner 120, and the display unit 170 through wired communication through a terminal or by short-range wireless communication. Here, the short-range wireless communication may be performed by using Bluetooth, Infrared Data Association (IrDA), WiFi, Wireless LAN, Radio Frequency (RF), Near Field Communication (NFC), or ZigBee communication.

The management unit 150 receives the barcode data from the barcode scanner 120. The management unit 150 extracts vehicle identification data from the barcode data. Such vehicle identification data is data set to identify the vehicle, and can be made through letters or numbers.

The management unit 150 receives the sensing data and the photographed image from the detection unit 100.

The management unit 150 generates the transformed image using the sensing data and the reference value. That is, the management unit 150 generates the transformed image using the reference value from the sensing data. At this time, the reference value can be inputted to the operator and set. The reference value may be set by reflecting the noise at the work site where the inspection process is performed.

The management unit 150 synthesizes the transformed image and the photographed image to generate a synthesized image. The management unit 150 provides the generated synthesized image to the display unit 170. The management unit 150 controls the display unit 170 to display the synthesized image.

The display unit 170 displays data on operations and results that occur during operation of the management unit 150.

That is, the display unit 170 can display the synthesized image generated by the management unit 150, and can display the result data.

Further, the display unit 170 can display the barcode data recognized by the barcode scanner 120, and can display the photographed image photographed by the detection unit 100.

Here, the management unit 150 and the display unit 170 are separately described as devices, but the present disclosure is not limited thereto. The management unit 150 and the display unit 170 may be formed as a single device. For example, the management unit 150 and the display unit 170 may be formed of a single device such as a test tower, a mobile communication terminal, a tablet PC, a notebook computer, and a portable computer such as a netbook.

Figure 2:
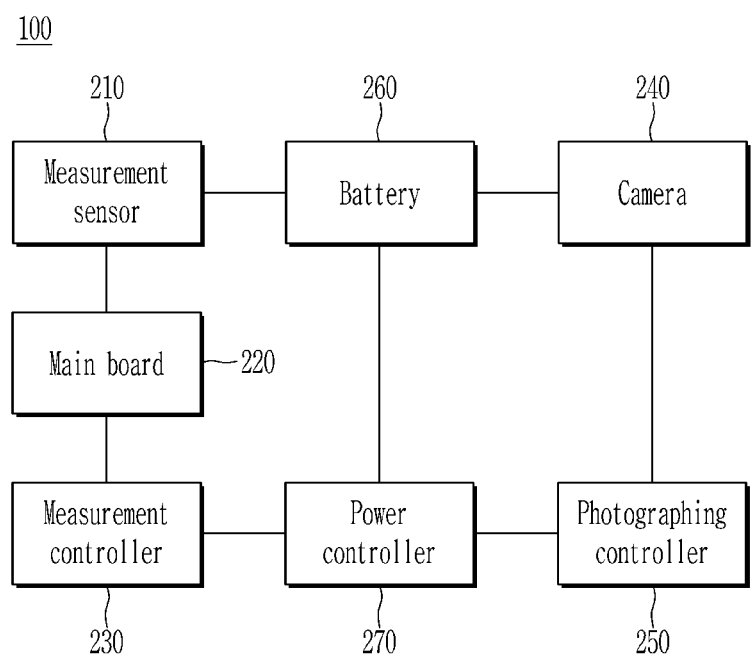
FIG. 2 is a schematic diagram showing a detection unit of a system for detecting an air leak in a commercial vehicle according to an exemplary embodiment of the present disclosure.
Figure 3:
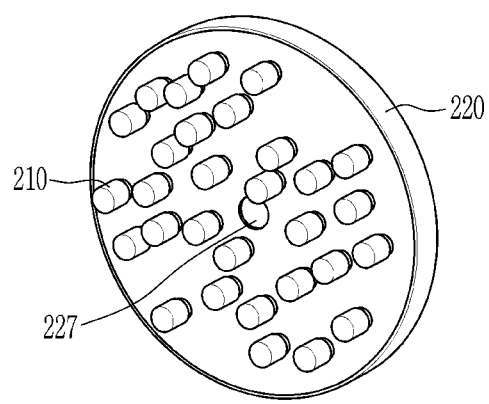
FIG. 3 is a perspective view showing a plurality of measurement unit mounted on a main board of a detection unit according to an exemplary embodiment of the present disclosure.

FIG. 2 is a schematic diagram showing a detection unit 100 of a system for detecting an air leak in a commercial vehicle according to an exemplary embodiment of the present disclosure, and FIG. 3 is a perspective view showing a plurality of measurement unit mounted on a main board 220 of a detection unit 100 according to an exemplary embodiment of the present disclosure.

The detection unit 100 includes a plurality of measurement sensors 210, a main board 220, a measurement controller 230, a camera 240, a photographing controller 250, a battery 260 and a power controller 270.

The plurality of measurement sensors 210 measure ultrasonic signals generated in a commercial vehicle. That is, the plurality of measurement sensors 210 measure ultrasonic signals generated in a leak portion where air is leaked.

The plurality of measurement sensors 210 provide the measured ultrasonic signals to the measurement controller 230. Since the ultrasonic signals generated in the leak portion are different in time to arrive according to the distance at which the measurement sensor 210 is located, the time for measuring the ultrasonic signals may be different between the plurality of measurement sensors 210. Each of the plurality of measurement sensors 210 may provide an ultrasonic signal to the measurement controller 230 when the ultrasonic signal is measured.

The plurality of measurement sensors 210 are installed on the main board 220 as shown in FIG. 3.

The main board 220 is provided with a plurality of measurement sensors 210. As shown in FIG. 3, the main board 220 is provided with a plurality of measurement sensors 210 arranged in a set pattern on the front surface thereof.

At this time, the setting pattern may represent a pattern set by a method of random sampling. That is, the setting pattern is set based on a parameter including the size of the camera 240, the diameter of the main board 220, the minimum distance between the measurement sensors 210 considering the size of the measurement sensor 210. Further, it may be a pattern set through a Monte Carlo Simulation technique.

The main board 220 is formed with a through hole 227 so that the camera 240 is exposed to the outside. The through holes 227 may be formed at the center of the main board 220.

The main board 220 may have a circular shape in cross section.

The main board 220 may be a printed circuit board (PCB).

The measurement controller 230 collects ultrasonic signals measured by the plurality of measurement sensors 210. That is, the measurement control unit 230 may collect ultrasonic signals from the plurality of measurement sensors 210 through the main board 220.

The measurement control unit 230 confirms the collection time of the ultrasonic signals collected from each of the plurality of measurement sensors 210. At this time, the collection time may be collected differently depending on the position of the measurement sensor 210.

The measurement controller 230 confirms the position data in which the leak portion is generated through the difference in the collection time.

The measurement controller 230 filters a plurality of ultrasonic signals collected from the plurality of measurement sensors 210. That is, the measurement control unit 230 identifies a plurality of ultrasonic signals and filters the noise signals excluding the ultrasonic signals generated in the leak portions. For example, the noise signal may include at least one of noise generated in the detection unit 100, vehicle noise vibration, body noise, and chassis noise.

The measurement control unit 230 calculates an average value of the filtered plurality of ultrasonic signals and generates size data for the leak portion based on the average value. At this time, the size data may be expressed in decibels (dB).

The measurement controller 230 generates sensing data using position data and size data for the leak portion.

The measurement controller 230 may generate the sensing data by matching the size data with the position data of the leak portion.

The measurement control unit 230 provides the generated sensing data to the management unit 150.

The camera 240 photographs a commercial vehicle. That is, the camera 240 photographs the commercial vehicle, and provides the photographed image signal to the photographing controller 250.

The camera 240 photographs the commercial vehicle every time the detection unit 100 moves.

The photographing controller 250 is electrically connected to the camera 240. The photographing controller 250 receives the image signal from the camera 240, transforms the image signal into an electrical signal, and generates a photographed image.

The photographing controller 250 provides the generated photographed image to the management unit 150.

The battery 260 supplies power to the plurality of measurement sensors 210 and the camera 240.

The battery 260 can be charged through electricity supplied from the outside under the control of the power controller 270.

The power controller 270 controls the power supply of the detection unit 100. That is, when power is supplied from the outside, the power controller 270 stops the power supplied from the battery 260 to the plurality of measurement sensors 210 and the camera 240, and supplies electricity supplied from the outside to the plurality of measurement sensors 210 and the camera 240. Further, the power controller 270 controls the battery 260 to be charged through electricity supplied from the outside.

Figure 4:
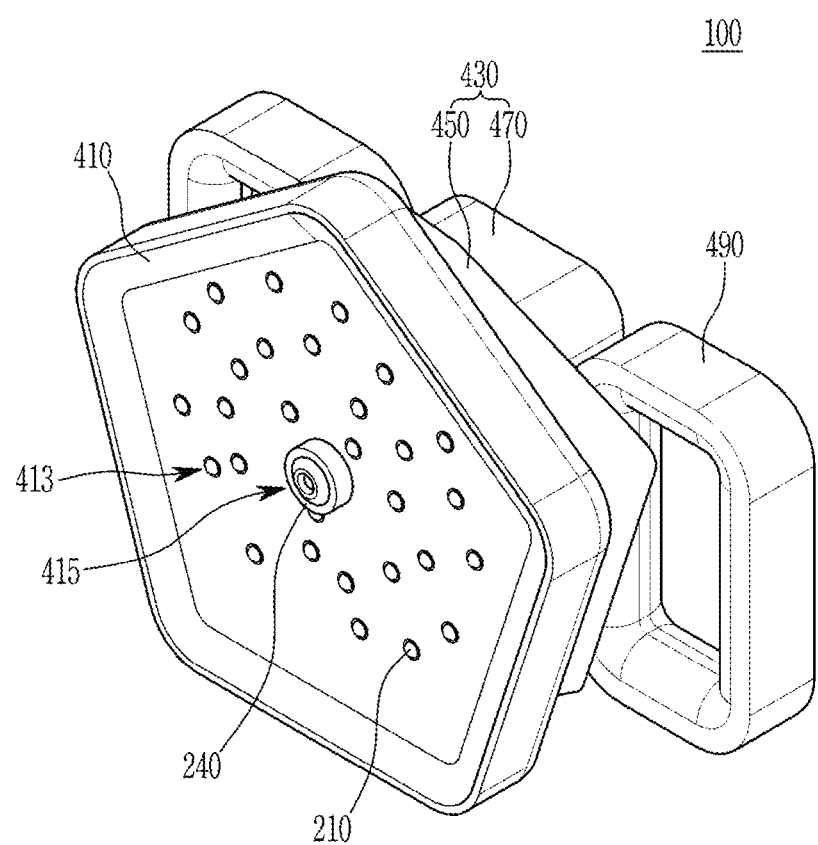
FIG. 4 is a perspective view showing a detection unit according to an exemplary embodiment of the present disclosure.
Figure 5:
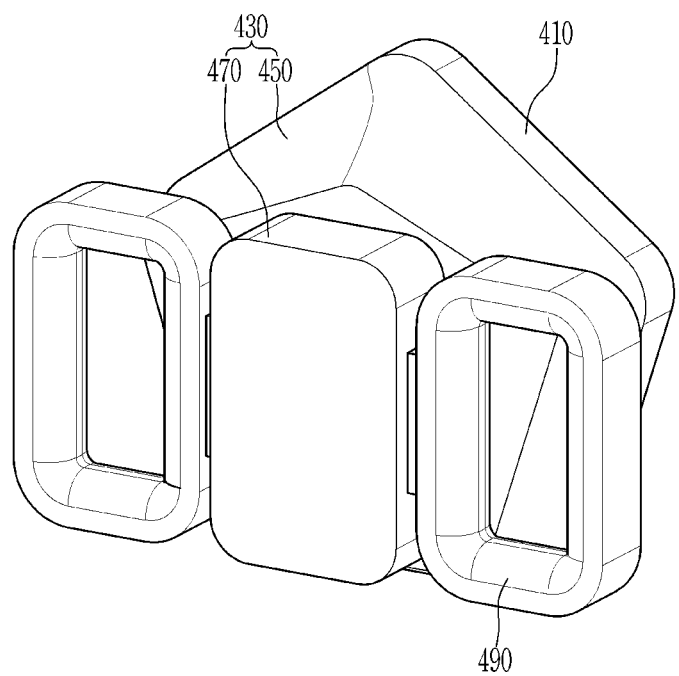
FIG. 5 is a rear view showing a detection unit according to an exemplary embodiment of the present disclosure.

FIG. 4 is a perspective view showing a detection unit according to an exemplary embodiment of the present disclosure, and FIG. 5 is a rear view showing a detection unit according to an exemplary embodiment of the present disclosure.

Referring to FIG. 4 and FIG. 5, the detection unit 100 includes a front cover 410, a case 430, and a handle 490.

The front cover 410 is formed on the front surface of the case 430.

The front cover 410 is formed with a plurality of holes corresponding to the plurality of measurement sensors 210 and the camera 240. That is, the front cover 410 is formed with an exposure hole 413 corresponding to each of the plurality of measurement sensors 210 so that the plurality of measurement sensors 210 are exposed to the outside and a central hole 415 so that the camera 240 is exposed to the outside.

The front cover 410 may be centered on the center hole 415, and a plurality of exposure holes 413 may be formed on the entire surface.

The front cover 410 has a polygonal cross section. For example, the front cover 410 may be formed in a pentagonal shape.

The case 430 receives the measurement main board, the measurement controller 230, the photographing controller 250, and the power controller 270. To this end, the case 430 includes a front receiving portion 450 and a rear receiving portion 470.

The case 430 is formed with a front opening, and a front cover 410 is installed on the front surface.

The front receiving portion 450 is formed inside the case 430 and receives the main board 220 provided with the plurality of measurement sensors 210.

The rear receiving portion 470 is formed inside the case 430 and connected to the front receiving portion 450. The rear receiving portion 470 receives the measurement controller 230, the photographing controller 250, and the power controller 270.

This case 430 can be manufactured by a plastic injection process.

The handle 490 is formed on both sides of the case 430 on which the rear receiving portion 470 is formed. The handles 490 are formed symmetrically with each other with the case 430 interposed therebetween.

The handle 490 may be formed in a ring shape. The handle 490 may have a rectangular cross section and rounded corners.

Hereinafter, a method for detecting an air leak in a commercial vehicle according to an exemplary embodiment of the present disclosure will be described with reference to FIGS. 6 to 9.

Figure 6:
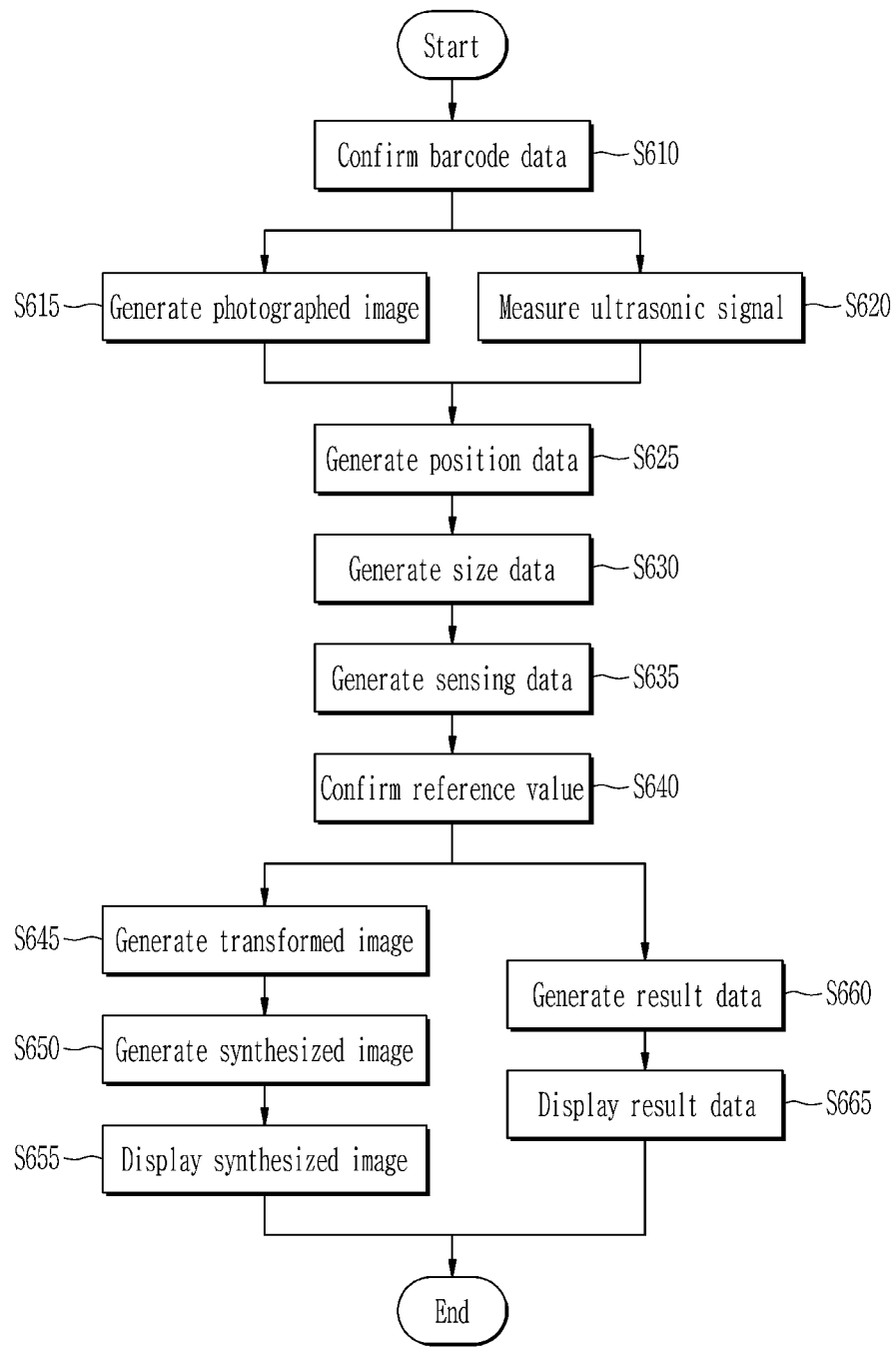
FIG. 6 is a flowchart of a method for detecting an air leak in a commercial vehicle according to an exemplary embodiment of the present disclosure.

FIG. 6 is a flowchart of a method for detecting an air leak in a commercial vehicle according to an exemplary embodiment of the present disclosure, FIG. 7 is an exemplary view for explaining a method for detecting an air leak in a commercial vehicle according to an exemplary embodiment of the present disclosure, FIG. 8 is an exemplary view for explaining a synthesized image of a method for detecting an air leak in a commercial vehicle according to an exemplary embodiment of the present disclosure, and FIG. 9 is an exemplary view for explaining a result data of a method for detecting an air leak in a commercial vehicle according to an exemplary embodiment of the present disclosure.

Referring to FIG. 6, the management unit 150 confirms the barcode data of the commercial vehicle (S610).

In other words, as shown in FIG. 7, when the commercial vehicle 700 enters the inspection process to detect an air leak, the barcode scanner 120 recognizes the barcode mounted on the commercial vehicle 700 and generates barcode data. The barcode scanner 120 provides the generated barcode data to the management unit 150. The management unit 150 confirms the barcode data provided from the barcode scanner 120 and extracts the vehicle identification data from the barcode data.

The detection unit 100 generates a photographed image for a commercial vehicle (S615). That is, the camera 240 of the detection unit 100 photographs a commercial vehicle to generate a photographed image.

The detection unit 100 may be installed on the commercial vehicle 700 as shown in FIG. 7. Thus, the detection unit 100 can photograph the upper portion of the commercial vehicle 700.

The detection unit 100 can be installed on the movable rail to move along the vehicle body longitudinal direction of the commercial vehicle to check the entire commercial vehicle. The detection unit 100 can detect an air leak for each of the plurality of measurement positions 733, 735, 737, and 739 while moving by a set distance along the movable rail as shown in FIG. 7. Here, the set distance may be set differently depending on the distance that the detection unit 100 can photograph and measure.

The detection unit 100 measures ultrasonic signals generated in a commercial vehicle (S620). In other words, the plurality of measurement sensors 210 of the detection unit 100 measure ultrasonic signals generated in a leaked portion where the air of the commercial vehicle is leaked.

The detection unit 100 generates position data for the leak portion using a plurality of ultrasonic signals (S625).

In other words, the measurement controller 230 of the detection unit 100 collects the ultrasonic signals from the plurality of measurement sensors 210, and generates the position data in which the leak occurs, through the collected acquisition time.

That is, the measurement controller 230 can generate the position data by confirming the position of the leak portion through the signal delay of the plurality of ultrasonic signals.

The detection unit (100) generates size data for the leak portion using a plurality of ultrasonic signals (S630).

Specifically, the measurement controller 230 of the detection unit 100 filters the noise signal including the noise of the detection unit 100 included in the plurality of ultrasonic signals, the vehicle noise vibration, the chassis noise, and the like.

The measurement controller 230 calculates an average value of the plurality of filtered ultrasonic signals, and generates size data for the leak unit based on the average value. That is, the measurement controller 230 may generate the size data by calculating the beam power level for the plurality of filtered ultrasonic signals.

The detection unit 100 generates sensing data for the leak portion (S635).

That is, the measurement controller 230 of the detection unit 100 generates sensing data including position data and size data for the leak portion. The sensing data may represent the position and size of the ultrasonic signal generated in the leak portion on the virtual plane. For example, the sensing data may be represented by reference numeral 810 of FIG. 8.

Then, the detection unit 100 provides the generated sensing data to the management unit 150.

The management unit 150 confirms the reference value (S640). That is, the management unit 150 provides a user interface (UI) for receiving a reference value, and can receive and confirm the reference value through the user interface. At this time, the reference value may be a value set to confirm the ultrasonic signal generated in the leak portion.

The management unit 150 generates the transformed image using the sensing data and the reference value (S645).

In other words, the management unit 150 extracts data in which the size data included in the sensing data is equal to or larger than the reference value, and generates extracted data. The management unit 150 generates the transformed image using the extracted data. At this time, the management unit 150 may generate the transformed image by changing the color of the extracted data based on the preset range. Here, the set range may be a range set for displaying the size of the ultrasonic signal in color. For example, the management unit 150 may display a red image when it is 50 or more from the reference value, and a blue image when it is 10 or more from the reference value to generate a transformed image.

The management unit 150 generates a synthesized image using the transformed image and the photographed image (S650).

Specifically, the management unit 150 confirms the pixels of the photographed image and transforms the transformed image to the pixels of the photographed image. Then, the management unit 150 identifies the leak portion in the photographed image based on the position data included in the sensing data, and displays the transformed image on the leak portion to generate the synthesized image.

For example, as shown in FIG. 8, the management unit 150 confirms the sensing data 810 and the photographed image 830, and transforms the sensing data into the transformed image 860. Then, the transformed image 860 may then be synthesized in the photographed image 830 to the leak portion 855 to produce a synthesized image 850.

The display unit 170 displays the synthesized image generated by the management unit 150 (S655).

The management unit 150 generates the result data using the sensing data and the reference value (S660).

In other words, the management unit 150 confirms the size data included in the sensing data, and determines whether the size data is equal to or larger than the reference value and is maintained for more than the set time. At this time, the set time may be set in advance to check whether or not the leak portion is generated.

The management unit 150 determines that the detection result is normal if the size data is less than the reference value or does not maintain the set time and determines that the detection result is defective if the size data is equal to or larger than the reference value and is maintained over the set time.

The management unit 150 generates the result data including the detection result.

Meanwhile, the management unit 150 can check the detection result based on the sensing data provided through the detection unit 100 for each of a plurality of measurement positions. Accordingly, the management unit 150 can generate the result data including the detection result matched to each of the measurement positions.

For example, the management unit 150 may generate the result data 900 as shown in FIG. 9. At this time, the result data may include detection results set for each of the vehicle identification information 910 and the measurement position 920.

The display unit 170 displays result data generated by the management unit 150 (S665).

Then, the management unit 150 generates management data by matching the vehicle identification data and the result data. Based on these management data, the production process of the commercial vehicle can be managed.

Thereafter, the operator can confirm the leak portion through the synthesized image and the result data displayed through the display unit 170, and complete the inspection process after repairing the leak portion where the air is leaked. That is, the operator can confirm that the measurement data is the normal 930 at the measurement positions #1, #2 and #4 through the result data 910 shown in FIG. 9, and can confirm that the measurement data is defective 940 at the measurement position #3. The operator can complete the inspection process after repairing the measurement position #3.

Accordingly, the system for detecting an air leak in a commercial vehicle according to the present disclosure can measure ultrasonic signals generated in a commercial vehicle through a plurality of measurement sensors and confirm the position and size of a leak portion in which air is leaked through the measured ultrasonic signal, and therefore, the detection time can be shortened and the accuracy can be improved.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A system for detecting an air leak in a commercial vehicle, comprising:
    a detection unit for measuring a plurality of ultrasonic signals generated in the commercial vehicle through a plurality of measurement sensors, confirming a position and size of a leak portion where air is leaked based on the plurality of ultrasonic signals to generate sensing data, and generating a photographed image by photographing the commercial vehicle;
    a management unit for generating a transformed image using a reference value and the sensing data, and a synthesized image by synthesizing the transformed image and the photographed image; and
    a display unit displaying the synthesized image,
    wherein the detection unit includes:
        the plurality of measurement sensors for measuring the plurality of ultrasonic signals generated in the leak portion;
        a camera for photographing the commercial vehicle;
        a main board on a front surface of which the plurality of measurement sensors are arranged in a set pattern;
        a photographing controller connected to the camera and generating a photographed image photographed through the camera;
        a battery for supplying power to the plurality of measurement sensors and the camera;
        a measurement controller for generating the sensing data based on the ultrasonic signals collected through the plurality of measurement sensors;
        a power supply controller for controlling power supply to the plurality of measurement sensors;
        a case having a front receiving portion having a front surface opened to receive the main board and a rear receiving portion connected to the front receiving portion and receiving the photographing controller, the battery, the measurement controller, and the power controller;
        a front cover having a plurality of holes corresponding to the camera and the plurality of measurement sensors so that the camera and the plurality of measurement sensors are exposed to the outside; and
        a handle formed on both sides of a rear of the case.

2. The system of claim 1, wherein:
    the measurement controller collects the plurality of ultrasonic signals from the plurality of measurement sensors, confirms a position data with respect to the leak portion based on a difference in the collected acquisition time, calculates an average value of the plurality of ultrasonic signals, and generates a size data for the leak portion based on the average value.

3. The system of claim 1, wherein the measurement controller filters a noise signal included in each of the plurality of ultrasonic signals.

4. The system of claim 1, wherein the management unit generates an extracted data by extracting data in which a size data included in the sensing data is greater than or equal to the reference value, and generates a transformed image using the extracted data.

5. The system of claim 1, wherein the management unit confirms the detection result based on a size data included in the sensing data and the reference value, and generates a result data including the detection result.

6. The system of claim 1, further comprising:
    a barcode scanner for recognizing the identification barcode of the commercial vehicle and generating barcode data,
    wherein the management unit receives barcode data from the barcode scanner, extracts vehicle identification data from the barcode data, and generates management data by matching the result data with the vehicle identification data.

7. A method for detecting an air leak in a commercial vehicle, comprising:
    confirming a barcode data of the commercial vehicle;
    measuring a plurality of ultrasonic signals generated in the commercial vehicle through a plurality of measurement sensors after photographing the commercial vehicle to generate a photographed image;
    generating sensing data by confirming a position and size of a leak portion where air is leaked based on the plurality of ultrasonic signals measured from the plurality of measurement sensors;
    generating a transformed image using a reference value from the sensing data;
    synthesizing the transformed image and the photographed image to generate a synthesized image; and
    displaying the synthesized image,
    wherein measuring the plurality of ultrasonic signals is performed by the plurality of measurement sensors by photographing the commercial vehicle for each of a plurality of measurement positions while moving by a predetermined distance along the longitudinal direction of the vehicle,
    wherein after the measuring step, the method further includes:

confirming a detection result using the sensing data generated for each of the plurality of measurement positions;

generating a result data including detection results matched to each of the plurality of measurement positions; and displaying the result data, and wherein generating the result data includes:

determining whether a size data included in the sensing data is greater than or equal to a reference value and is maintained for more than a preset time; and generating the result data by determining to be defective if it is determined that the set time is maintained or longer.

8. The method of claim 7, wherein generating the sensing data includes:

collecting the plurality of ultrasonic signals from the plurality of measurement sensors;

confirming a position data with respect to the leak portion based on a difference in the collected acquisition time;

calculating an average value of the plurality of ultrasonic signals;

generating a size data for the leak portion based on the average value; and generating sensing data including the position data and the size data.

9. The method of claim 7, wherein generating the transformed image includes:

generating an extracted data by extracting data in which a size data included in the sensing data is greater than or equal to the reference value; and generating a transformed image using the extracted data.

* * * * *